Feb. 23, 1960 P. P. SPISELMAN 2,926,088
METHOD OF BREWING COFFEE
Filed Feb. 8, 1955

INVENTOR.
PHILLIP P. SPISELMAN
BY
Leonard H. King
AGENT

United States Patent Office 2,926,088
Patented Feb. 23, 1960

2,926,088
METHOD OF BREWING COFFEE
Phillip P. Spiselman, Brooklyn, N.Y.
Application February 8, 1955, Serial No. 486,786
16 Claims. (Cl. 99—71)

This invention relates to an improved method for coffee-making, apparatus therefor, and, in particular, to improved filter media.

There has long existed a need for a truly satisfactory filter type coffee-making apparatus.

Partial solutions to this problem include coffee brewers of the type wherein a receptacle is provided to which is added a mixture of comminuted coffee bean and hot water. A filter means which may be a perforated metal, ceramic, or cloth strainer, is usually provided for the purpose of separating the coffee bean particles from the liquid which is caught in a collection container. One of the undesirable features of this prior apparatus is that the container becomes soiled with coffee and necessitates a rather messy cleaning operation. A further improvement in the art was the introduction of a paper filter which solved the cleaning problem.

In using the paper filter it is customary to form it into a cone which is in turn supported in a funnel. Comminuted coffee bean and hot water are added and the extracted coffee solution immediately filters through to a collection vessel. When the filtrate has passed through the filter the paper cone may be removed together with the coffee residue and discarded.

The two types of prior art devices discussed have a common deficiency in that the hot water begins to run through the filter before the soluble coffee has been extracted from the comminuted coffee bean. If the filtrate were to be critically examined it would be noted that at first the filtrate is almost water white. In order to obtain a filtrate of sufficient strength it is therefore necessary to use an excessive quantity of coffee bean so that the final portion of filtrate is sufficiently concentrated to bring the average strength of the coffee extract to a proper level for consumption or else recirculate the filtrate. Attempts to solve this problem by using paper of low porosity so as to obtain a slow filtering rate were unsuccessful. Paper having fine pores tend to become clogged by the finely divided particles of coffee bean. In general, excessive filtering time is objected to by the consumer.

This invention provides filter media having a deferred filtering period, that is to say filters having substantially zero porosity for an initial period sufficient for the soluble coffee to be extracted from the comminuted bean by hot water. After the initial period the filtrate is permitted to flow freely. Since the entire portion of water is available to serve as a leaching agent during said deferred period, the overall leaching time may be reduced. This factor permits the employment of a highly porous membrane and avoids the earlier discussed objections of low porosity filters.

It is an object of this invention to provide filter media having deferred filtration periods.

It is a particular object of this invention to provide non-porous filter media which may be rendered porous by treatment with hot water.

An object of this patent is to provide filter media bearing a coating of a water soluble material so as to render said filter paper non-porous for a predetermined period after being subjected to hot water.

An object of this invention is to provide an improved filter medium having an impermeable surface coating consisting of a plurality of layers of water soluble materials.

Another and particular object of this invention is to provide an economical method of brewing coffee and an apparatus therefor.

A still different object of this invention is to provide a means for conveniently introducing additives to coffee brews.

Further objects and pertinent details will be more specifically described and illustrated in the following specifications and drawings in which.

Briefly stated, this invention provides filter media which are rendered but temporarily impermeable by the coating of porous media with a water soluble film or by compacting the surface to provide a surface which is water impermeable until it is swollen by the action of the water.

In carrying out this invention I prefer to employ a highly porous filter paper.

This porous paper is then tub-sized with a fairly viscous solution of a water soluble agent. By "tub-sized" is meant passing the paper through a vessel containing the agent so that it picks up a coating. The coating is then dried. A viscous solution is preferred over a thin solution as absorption by the paper is minimized. If spray or other coating methods are employed then less viscous solutions are suitable.

Suitable coating materials need be non-toxic, free from objectionable color, odor or taste, and stable under ordinary conditions of storage and use. Additionally it should be cheap, economical, readily available, not subject to insect infestation, easy to handle, have good film-forming characteristics and adhesive strength.

Materials meeting the aforementioned requirements include, but are not limited to, the following: sodium carboxy methyl cellulose, starch, glucose, methyl cellulose, gum tragacanth, guar gum, gum arabic, locust bean gum, polyvinyl alcohol, casein, paraffin and/or compatible mixtures thereof.

Figure 1:
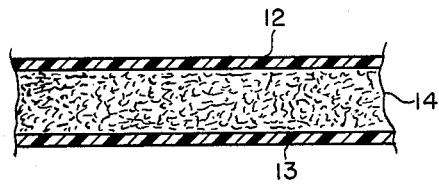
Figure 1 is a cross-sectional view of a section of filter media of this invention.

Two distinct water soluble layers 12 and 13 are provided for filter paper 14 as shown in Figure 1. This provides a considerable time delay to the passage of a liquid through the filter even if highly soluble materials are employed as both coatings need be dissolved before the filtrate begins to pass through the filter paper.

Figure 2:
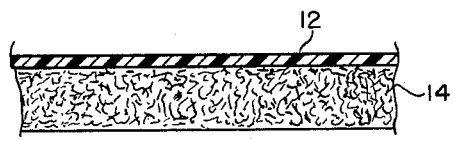
Figures 2 and 3 are cross-sectional views of sections of still other embodiments of filter media of this invention.
Figure 3:
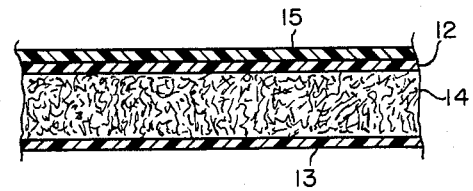

If it is desired to coat but one side of the filter medium 14 the water soluble coating 12 may be applied by conventional spraying or doctor blade techniques. This embodiment is shown in Figure 2.

Additional time delays may be obtained by further coating the side of the paper which will be exposed to the water with an additional coating 15 of a water soluble material meeting the earlier mentioned standards. It is preferred to use for coating 15 a less soluble material than for coating 13. Coating 15 is preferably applied by spraying or doctor blade techniques.

Figure 4:
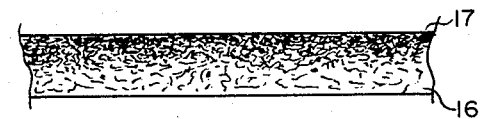
Figure 4 is a cross-sectional view of a section of still another embodiment of filter media of this invention.

In Figure 4 another embodiment of this invention is discosed wherein a smooth surfaced paper 16 is processed as by calendering or mechanically polishing with a smooth surfaced rotating stone wheel so as to physically close the surface pores. When hot water is poured onto the filter paper, the paper swells reopening the closed pores of the compacted surface 17. Thus a time delay is built into the filter paper which permits the hot water time to leach the water soluble components out of the comminuated coffee bean. For this purpose a creped surface paper should not be employed although highly satisfactory for the coated embodiment of this invention. The same effect may be obtained by "shot-peening" the surface of the paper. By "shot-peening" is meant repeatedly impacting the surface with small hard particles which may be given velocity by an air stream or by a vibrating table.

The flavor of coffee may be modified by the addition of crushed eggshell to the ground coffee bean. The filter media of this invention provide a convenient method of introducing the eggshell as disclosed in Example 5. In this example finely crushed eggshell was dispersed in the coating material. When the coating is dissolved the eggshell is present to perform its functions. In a like manner other additives such as chicory may be introduced into the filter medium thus simplifying for the housewife the task of brewing coffee.

One of the objects of this invention, as has been earlier pointed out, is to provide an economical method of brewing coffee. With this object in mind the various examples, in general, use a minimum quantity of coffee and therefore inherently require the efficient extraction of the soluble fraction from the coffee bean for satisfactory results. Empirically I have found that ten to twelve minutes of leaching time is the maximum allowable based on practical considerations. Accordingly, a sufficient amount of comminuted coffee bean has been employed consistent with this time, except in Example 4 where 50% more coffee is used so as to permit a satisfactory brew in only five minutes of filtering time.

Filter papers used in the chemical field are carefully catalogued as to porosity and retentive qualities. In the following examples a few such papers are specifically mentioned. It is to be understood that the composition of the paper is not essential to the invention provided it is porous, has reasonable wet strength, is free from usual additives such as alum, is neutral and relatively mineral-free. In general the papers may be smooth or crepe surfaced. There is described hereinafter a preferred paper but it is to be clearly understood that other filter media may be employed.

Characteristics of preferred papers:

(1) Fiber composition consists of chemical wood fiber and rag fiber (no ground wood present).

(2) Basis weight 47.5 lbs./500—25" x 40" sheets.

(3) Bulking factor—creped surface 0.127"/10 sheets. Bulking factor—smooth surface 0.07"/10 sheets.

(4) Air permeability (Gurley test) 1 sec./100 cc. air/sheet.

(5) Water absorption (Tappi[1] test 432) 17 sec.

(6) Tear resistance—7 grams of force required to tear one sheet.

(7) Bursting strength—16 points Mullen.

(8) pH—6.6.

(9) Mineral content (ash)—.15%.

*Example 1.*—A sheet of the above described preferred creped paper was coated having the characteristics given earlier with 10.7 milligrams of methyl cellulose having a viscosity of 100 cps. The methyl cellulose was dissolved to form a 0.089% solution. 12 cc. of the solution was spread upon a glass tabletop and soaked up by the paper. The paper was placed on a plastic screen and allowed to dry.

The paper was formed into a cone and mounted in a filtering funnel. Three ounces by volume of finely comminuted coffee bean, commonly called "drip grind"

[1] Tappi—Technical Association Paper and Pulp Industry.

was added to the cone followed by 24 ounces by volume of boiling water.

After 10 seconds the first drop of filtrate appeared. The dripping continued at an increasing rate until after 120 seconds a thin steady stream was maintained. After 15 minutes filtering was complete. The coffee was tasted and found to be of excellent quality.

*Example 2.*—The experiment of Example 1 was repeated with the same untreated paper. The filtrate appeared immediately. Filtering was complete in 3 minutes. The filtrate was unsatisfactory as coffee.

*Example 3.*—Example 1 was repeated using 210 mg. of gum tragacanth deposited from 20 cc. of a 10% aqueous solution.

Filtering action was noted 12 seconds later, with a full stream developing after 2 minutes. Filtering was completed in 12 minutes. The coffee was very good.

*Example 4.*—The procedure of Example 1 was followed using 400 milligrams of guar gum (edible grade) which was deposited from a 1.5%, by weight, aqueous solution. 50% more coffee (4½ ounces) was employed than in Example 1.

Filtering began in 10 seconds developing to a steady, but medium, stream in 60 seconds. Filtering was complete in five minutes. The coffee was of good color and taste.

*Example 5.*—The procedure of Example 1 was repeated with one gram of finely crushed eggshell having an average particle size of approximately 200 mesh dispersed in the coating material.

No effect on filtering time was noted. The flavor of the coffee was excellent.

*Example 6.*—The procedure of Example 1 was repeated using 51 mg. of sodium carboxy methyl cellulose deposited from a 0.5% aqueous solution.

The filtrate appeared in 10 seconds, after 60 seconds a thin steady stream appeared. Filtering was complete in 11 minutes. The coffee was excellent.

*Example 7.*—The procedure of Example 1 was repeated using 2100 mg. of polyvinyl alcohol (Du Pont "Elvanol" 72–60) deposited from an 8% aqueous solution.

The filtrate appeared in 27 seconds, after 180 seconds a thick steady stream appeared. Filtering was complete in 7 minutes. The coffee was excellent.

*Example 8.*—The procedure of Example 1 was repeated using 2375 mg. of casein PV–8979 obtained from the Borden Corp. and deposited from a 15% aqueous solution.

The filtrate appeared in 18 seconds, after 60 seconds a thin steady stream appeared. Filtering was complete in 8 minutes. The coffee was light.

*Example 9.*—The procedure of Example 1 was repeated using 450 mg. of locust bean gum deposited from a 1.5% solution.

The filtrate appeared in 25 seconds, after 90 seconds a thin steady stream appeared. Filtering was complete in 12 minutes. The coffee was excellent.

*Example 10.*—The filter cone was prepared as in Example 1. Two ounces of tea leaves and 24 ounces of boiling water were added. The filtering time was comparable to that of Example 1. The tea was of excellent color and taste.

*Example 11.*—A filter paper was prepared as in Example 4. Then 5 mg. of methyl cellulose was deposited on one side by spraying a .08% aqueous solution by weight. Only 3 oz. of coffee were used.

When tested the first drop of filtrate appeared in 90 seconds and filtering was complete in 6 minutes. The filtrate was of excellent color and taste. This shows the advantage of the deferred filtering period.

*Example 12.*—A smooth surface filter paper of close texture and medium filtering speed which was supplied by the Eaton-Dikeman Co. of Mt. Holly Springs, Pennsylvania, under their number 952 was folded to fit a standard 60° funnel. 250 cc. of boiling water was added to 15 grams of finely divided coffee. Filtering began immediately and was substantially finished in three minutes. The coffee filtrate was very light in color. It required two successive passes of the filtrate over the coffee before the coffee extract was sufficiently concentrated.

*Example 13.*—A second sheet of the same paper as used in Example 12 was surface polished by ironing with a steam iron to close surface pores. The coffee brewing procedure was repeated. A few drops of filtrate did appear after ten seconds. The rate increased gradually so that after one minute a steady stream of filtrate was passing through the filter. The total filtering time was 8 minutes and the filtrate was of suitable strength.

*Example 14.*—Example 1 was repeated using Eaton-Dikeman Co. No. 617 heavy creped paper having a basis weight of 100 lbs. was coated with 203 mg. methyl cellulose deposited from a 1% aqueous solution.

When tested the first drop of filtrate appeared in 30 seconds, with a steady stream developing in 90 seconds. Filtering was completed in 8 minutes. The coffee was excellent.

The process of this invention is not to be confused with the introduction of a water soluble material in the paper pulp beater so as to render the resulting paper waterproof. Also the product of this invention is not to be confused with filters using soluble binders and whose porosity is not affected by the binder. The filter of this invention is provided with a temporarily impervious coating.

Instead of a porous filter paper, a porous finely woven cloth, finely perforated metal or synthetic resin sheeting or a matting of cotton, glass or other filters may be employed. If metal is employed I prefer to use a thin perforated aluminum foil so that a low cost disposable product is obtained.

While the improved filter media of my invention may be utilized in conjunction with conventional funnel devices currently available and in particular those intended for coffee brewing, I prefer to utilize the improved apparatus disclosed in my copending application entitled "Rapid Filtering Coffee Maker," Serial Number 406,305 now abandoned in favor of my continuation-in-part application entitled "Filter Supporting Funnel," U.S. Patent 2,859,878.

It is to be understood that while described generally as a filter media intended primarily for the brewing of coffee it may also be used for the preparation of tea, as shown by Example 10, or other filtrates containing a water soluble extract.

In accordance with the patent statutes, I have set forth in the specification and more particularly in Example 1 the best mode presently contemplated for carrying out the invention. I desire to have it understood that this best mode and other embodiments set forth herein are only illustrative of the invention and that obvious changes may be made within the scope of the following claims without departing from the spirit of my invention.

What is claimed as new is:

1. The method of brewing coffee comprising the steps of adding comminuted coffee beans to a filter member, said filter member being characterized by the presence of sufficient edible, objectionable odor and taste free, soluble agent so as to render said filter member totally non-porous for about ten seconds when subjected to boiling hot water, while simultaneously extracting the desired constituents from said comminuted coffee beans so as to produce a palatable coffee brew in a single passage of water through said filter member.

2. The method of claim 1 wherein said filter member is a normally porous paper.

3. The method of claim 2 wherein said edible water soluble agent is sodium carboxy methyl cellulose.

4. A fibrous filter paper having a porous portion and a compacted surface portion, said surface portion being characterized by being non-porous until wet with water.

5. A filter member suitable for use as a retention means for coffee bean particles and hot water during the extraction of soluble constituents from the coffee bean particles by exposure to the hot water, said filter member being characterized by being non-porous to the hot water for a period corresponding to the leaching time of the soluble constituents of the coffee bean, said filter member comprising a normally porous sheet coated with a thin layer of an innocuous edible water soluble material selected from the group consisting of sodium carboxy methyl cellulose, starch, methyl cellulose, gum tragacanth, guar gum, gum arabic, locust bean gum, polyvinyl alcohol and casein.

6. A filter member suitable for use as a retention means for coffee bean particles and hot water during the extraction of soluble constituents from the coffee bean particles by exposure to the hot water, said filter member being characterized by means non-porous to the hot water for a period corresponding to the leaching time of the soluble constituents of the coffee bean, said filter member comprising a normally porous sheet having its exposed surfaces coated with a thin layer of innocuous edible water soluble material selected from the group consisting of sodium carboxy methyl cellulose, starch, methyl cellulose, gum tragacanth, guar gum, gum arabic, locust bean gum, polyvinyl alcohol and casein.

7. A filter member suitable for use as a retention means for coffee bean particles and hot water during the extraction of soluble constituents from the coffee bean particles by exposure to the hot water, said filter member being characterized by being non-porous to the hot water for a period corresponding to the leaching time of the soluble constituents of the coffee bean, said filter member comprising a thin normally porous sheet coated with a plurality of distinct layers of innocuous edible water soluble materials, said layer being composed of materials of unlike solubilities wherein said materials are selected from the group consisting of sodium carboxy methyl cellulose, starch, methyl cellulose, gum tragacanth, guar gum, gum arabic, locust bean gum, polyvinyl alcohol and casein.

8. The filter member of claim 7 wherein one of said layers is methyl cellulose and another is guar gum.

9. A filter medium suitable for use as a retention means for coffee bean particles and hot water during the extraction of soluble constituents from the coffee bean particles by exposure to the hot water, said filter medium being characterized by being non-porous to the hot water for a period corresponding to the leaching time of the soluble constituents of the coffee bean, said filter medium comprising a porous filter paper impregnated with an innocuous edible water soluble material so as to render said filter paper temporarily non-porous to hot water, said water soluble material being selected from the group consisting of sodium carboxy methyl cellulose, starch, methyl cellulose, gum tragacanth, guar gum, gum arabic, locust bean gum, polyvinyl alcohol and casein.

10. A filter medium suitable for use as a retention means for coffee bean particles and hot water during the extraction of soluble constituents from the coffee bean particles by exposure to the hot water, said filter medium being characterized by being non-porous to the hot water for a period corresponding to the leaching time of the soluble constituents of the coffee bean, said filter medium comprising a porous filter paper impregnated with methyl cellulose so as to render said paper non-porous to hot water until said methyl cellulose is dissolved.

11. A filter medium suitable for use as a retention means for coffee bean particles and hot water during the extraction of soluble constituents from the coffee bean particles by exposure to the hot water, said filter medium being characterized by being non-porous to the hot water for a period corresponding to the leaching time of the soluble constituents of the coffee bean, said filter medium comprising a porous filter paper sheet impregnated with sodium carboxy methyl cellulose so as to render said paper non-porous to hot water until said sodium carboxy methyl cellulose is dissolved.

12. A filter medium suitable for use as a retention means for coffee bean particles and hot water during the extraction of soluble constituents from the coffee bean particles by exposure to the hot water, said filter medium being characterized by being non-porous to the hot water for a period corresponding to the leaching time of the soluble constituents of the coffee bean, said filter medium comprising a porous filter paper sheet impregnated with guar gum so as to render said paper non-porous to hot water until said guar gum is dissolved.

13. A filter medium suitable for use as a retention means for coffee bean particles and hot water during the extraction of soluble constituents from the coffee bean particles by exposure to the hot water, said filter medium being characterized by being non-porous to the hot water for a period corresponding to the leaching time of the soluble constituents of the coffee bean, said filter medium comprising a porous filter paper sheet impregnated with polyvinyl alcohol so as to render said paper non-porous until said polyvinyl alcohol is dissolved.

14. A filter medium suitable for use as a retention means for coffee bean particles and hot water during the extraction of soluble constituents from the coffee bean particles by exposure to the hot water, said filter medium being characterized by being non-porous to the hot water for a period corresponding to the leaching time of the soluble constituents of the coffee bean, said filter medium comprising a porous filter paper sheet impregnated with an innocuous water soluble casein so as to render said paper non-porous until said casein is dissolved.

15. A porous filter medium suitable for use as a retention means for coffee bean particles and hot water during the extraction of soluble constituents from the coffee bean particles by exposure to the hot water, said filter medium comprising filter paper coated with an innocuous edible water soluble material selected from the group consisting of sodium carboxy methyl cellulose, starch, methyl cellulose, gum tragacanth, guar gum, gum arabic, locust bean gum, polyvinyl alcohol and casein, so as to render said filter medium temporarily non-porous to hot water until said coating is dissolved by the water, said coating being sufficiently thick to render said filter member non-porous for a period corresponding to the leaching time of the soluble constituents of the coffee bean, and wherein said coating includes a minor proportion of eggshell in finely divided form.

16. A porous filter medium suitable for use as a retention means for coffee bean particles and hot water during the extraction of soluble constituents from the coffee bean particles by exposure to the hot water, said filter medium comprising filter paper coated with an innocuous edible water soluble material selected from the group consisting of sodium carboxy methyl cellulose, starch, methyl cellulose, gum tragacanth, guar gum, gum arabic, locust bean gum, polyvinyl alcohol and casein, so as to render said filter medium temporarily non-porous to hot water until said coating is dissolved by the water, said coating being sufficiently thick to render said filter member non-porous for a period corresponding to the leaching time of the soluble constituents of the coffee bean, and wherein said coating includes a minor proportion of chicory.

References Cited in the file of this patent

UNITED STATES PATENTS

| | | |
|---|---|---|
| 231,585 | Jeffs | Aug. 24, 1880 |
| 849,181 | Yoerg | Apr. 2, 1907 |
| 893,074 | Herron | July 14, 1908 |
| 975,874 | Korn et al. | Nov. 15, 1910 |
| 1,010,721 | Brown | Dec. 5, 1911 |
| 1,083,900 | Brown | Jan. 6, 1914 |
| 1,324,662 | Goldsworthy | Dec. 9, 1919 |
| 1,877,971 | Reid | Sept. 20, 1932 |
| 2,134,276 | Roscher et al. | Oct. 25, 1938 |
| 2,273,422 | Schroeder | Feb. 17, 1942 |
| 2,327,250 | Cruickshank | Aug. 17, 1943 |

OTHER REFERENCES

Industrial and Engineering Chemistry, October 1945, pp. 943 and 945.